(12) United States Patent
Rosenbach et al.

(10) Patent No.: US 7,433,872 B2
(45) Date of Patent: Oct. 7, 2008

(54) HIERARCHICAL REPOSITORY FOR CONFIGURATION-RELATED AND PERFORMANCE-RELATED INFORMATION RELATED TO COMPUTERIZED SYSTEMS

(75) Inventors: Yariv Rosenbach, Hod Hasharon (IL); Avishai Abrahami, Petach Tikva (IL); Gregory Bondar, Rishon Lezion (IL)

(73) Assignee: SWsoft Holdings, Ltd. (BM)

(*) Notice: Subject to any disclaimer, the term of this patent is extended or adjusted under 35 U.S.C. 154(b) by 391 days.

(21) Appl. No.: 11/115,095

(22) Filed: Apr. 26, 2005

(65) Prior Publication Data

US 2005/0283481 A1 Dec. 22, 2005

Related U.S. Application Data

(63) Continuation of application No. PCT/IL03/00885, filed on Oct. 27, 2003.

(51) Int. Cl.
*G06F 17/30* (2006.01)
(52) U.S. Cl. .............. 707/10; 707/2; 709/226
(58) Field of Classification Search ............ 707/1, 707/2, 10; 705/8; 709/226
See application file for complete search history.

(56) References Cited

U.S. PATENT DOCUMENTS

| | | | |
|---|---|---|---|
| 5,341,477 A * | 8/1994 | Pitkin et al. ............ 709/226 |
| 6,189,000 B1 * | 2/2001 | Gwertzman et al. ........... 707/1 |
| 6,785,756 B2 * | 8/2004 | Candea et al. ............. 710/220 |
| 2002/0051020 A1 * | 5/2002 | Ferrari et al. ............. 345/854 |
| 2002/0129000 A1 * | 9/2002 | Pillai et al. ............... 707/1 |
| 2003/0140179 A1 * | 7/2003 | Wilt et al. ............... 709/321 |
| 2003/0154284 A1 * | 8/2003 | Bernardin et al. .......... 709/226 |
| 2003/0212775 A1 * | 11/2003 | Steele et al. .............. 709/223 |
| 2004/0064433 A1 * | 4/2004 | Thier et al. ................ 707/1 |
| 2004/0205581 A1 * | 10/2004 | Gava ...................... 715/513 |

FOREIGN PATENT DOCUMENTS

| | | |
|---|---|---|
| EP | 0 905 621 | 3/1999 |
| EP | 905621 A1 * | 3/1999 |
| WO | WO 01/33433 | 5/2001 |

OTHER PUBLICATIONS

Andrzej Goscinski and Mirion Bearman, Resource Management in Large Distributed Systems; Operating Systems Review, ACM Headquater, Oct. 1, 1990, p. 7-25, vol. 24, No. 4.

* cited by examiner

*Primary Examiner*—Shahid Al Alam
*Assistant Examiner*—Phong Nguyen
(74) *Attorney, Agent, or Firm*—Bardmesser Law Group

(57) ABSTRACT

Method allowing a computerized manager to transparently allocate computational resources to a plurality of users. A plurality of computers or servers are provided for accommodating the computational resources or for storing data. These computational resources and the data are arranged as a hierarchical repository. A root computer is used as an interface between the users and the computers or servers. The root computer is capable of communicating with the users, with the computers or with servers. The computers or servers are controlled and the manager is allowed to allocate computer resources to the users. Information is stored in the computers or servers, in a local repository or in the system files of the computers or servers. Whenever desired, stored information is retrieved from the computers or servers and then the manager dynamically allocates computational resources that are required for each of the users through the root computer, essentially without interfering with the continuous operation of the users.

22 Claims, 6 Drawing Sheets

```
<ROOT>
    <ALLUSERS>
        <USER1 NAME="COMMON" DISKQUOTA="50" />
    </ALLUSERS>

<CPU CURRENT="554321"
        DAYS[1]="334"
        DAYS[2]="444"
        ...
        MONTHS[1]="8838432"
        MONTHS[2]="9349393"
        ... />

<COMPUTERS>
        <COMP1>
            <CONFIGURATION
                MEMORY="256"
                DISKQUOTA="2000.4" />
            <ADDRESS IP="123.456.789.012" />
            <ALLUSERS>
                <USER1 NAME="DAVID SMITH" DISKQUOTA="50"/>
                <USER2 NAME="JAKOB CHOEN" DISKQUOTA="150" />
                <USER3 NAME="SAMUEL LEVIN" DISKQUOTA="500" />
            <ALLUSERS>
            <CPU
                CURRENT="4435"
                DAYS[1]="33445"
                DAYS[2]="554"
                ...
                MONTHS[1]="44456"
                ...
             />
        </COMP1>
    </COMPUTERS>
</ROOT>
```

*Fig. 2*

```
<API>
    <RESPONSE CMD_ID="16651" RESULT="OK"/>
</API>
```

```
<API>
    <RESPONSE CMD_ID="17743" RESULT="OK">
        <NODE
601     NAME="DAVID SMITH"
        DISKQUOTA="50"
            KEY="USER1"
            KEYS_PATH="\COMPUTERS\COMP1\ALLUSERS\USER1"/>
        <NODE
601         NAME="JAKOB CHOEN"
            DISKQUOTA="150
            KEY="USER2"
            KEYS_PATH="\COMPUTERS\COMP1\ALLUSERS\USER2"/>
        <NODE
601         NAME="SAMUEL LEVIN"
            DISKQUOTA="500"
            KEY="USER3"
            KEYS_PATH="\COMPUTERS\COMP1\ALLUSERS\USER3"/>
        <NODE
601         NAME="DAVID"
            DISKQUOTA="500" KEY="USER4"
            KEYS_PATH="\COMPUTERS\COMP1\ALLUSERS\USER4"/>
    </RESPONSE>
</API>
```

*Fig. 6*

```
<API>
    <RESPONSE                    701
         CMD_ID="17743"          702                           703
         ERROR_NO="14"                                          /
700  {   ERROR_MSG="SERVER FAILED TO PERFORM
         OPERATION DUE TO A RUN TIME ERROR."
         RESULT="ERROR"
     />                            704
</API>
```

Fig. 7

HIERARCHICAL REPOSITORY FOR CONFIGURATION-RELATED AND PERFORMANCE-RELATED INFORMATION RELATED TO COMPUTERIZED SYSTEMS

RELATED APPLICATION

This application is a continuation of International Patent Application Serial No. PCT/IL2003/000885, filed Oct. 27, 2003, the contents of which are here incorporated by reference in their entirety.

BACKGROUND OF THE INVENTION

1. Field of the Invention

The present invention is related to the field of computers resources management. More particularly, the invention is related to a method for storing, updating and retrieving information, related to such matters as the allocation of computing resources, which are associated with a plurality of clients/users hosted by a web host, and may include both hardware (CPU, disk space, bandwidth, etc.) and services (FTP, Web, etc.).

2. Prior Art

Although reference is made herein to Web hosting companies, as possible users of the invention, it should be noted that the invention can be used for retrieving information of other sorts as well, and the mentioning of Web hosting companies is for an illustrative purposes only.

Web hosting companies, or WHCs, are companies that own, control and allocate many powerful computers to consumers. Their business is to sell their computer resources to smaller clients, who use these resources for their own business. Each one of the WHC's clients is given private domain, website, e-mail address etc. The task of a WHC is allocating its computer resources to its clients, according to the level of service each client purchased from the WHC. This allocation might include some limit on the resources. This way, no one of the WHC's clients would be able to consume more resources of the WHC's computer than he had paid for, thereby guaranteeing that the other clients on the same machine will get the resources they paid for. Some WHC's, however, only monitor the actual use of their resources, and bill their clients accordingly.

In addition, there are companies with an even larger number of computers, which in turn hire or sell them to a multitude of WHCs for a margin of the profits. They also have a similar goal, of allocating their resources among the WHCS. Such WHCs that buy these resources from a larger WHC and sell them to their own clients are referred to as resellers.

In order to have efficient management of computer resources, it is important for the WHC manager to have easy access for allowing easy retrieval and updating of information regarding the availability of the computer resources. This information is either static (e.g., the amount CPU resources allocated to a certain client) or dynamic (e.g., the client's current CPU usage), and is required for several reasons.

A first reason is that the WHC manager can obtain indications to what extent a client used the resources for a certain period, and formulate his billing to this user by using this information. This billing could take any form, the common way being a payment for some fixed package of computer resources, and if the client ends up exceeding this package, then he would pay an incremental fee, which is more expensive, for the amount by which he exceeded this fixed package. In order to prevent one client from using too many resources, the extra resources he may use are limited. For example, a package of disk memory could be $200 for 20 gigabytes, plus $15 for each additional gigabyte, for up to 20 more gigabytes. This example illustrates how the WHC would determine how much to charge the client, after analyzing his usage of computer resources. Conversely, the client can use this information to see how much he had used the computer resources for a certain period, and verify that his billing was correct.

A second reason is that this information can show the WHC manager if there is a need to change the allocation of computer resources for a certain client. For example, if a client buys 10 gigabytes of disk memory each month, but actually uses half of it, then he could alert the client that perhaps it's better for him to purchase a smaller package, and this would free the unused memory for other clients who may need it. This type of manipulation could be beneficial for the WHC manager. For example, if the 10 GB package, this client bought, costs $15, while a 5 GB package costs 10$, then it's more beneficial for him to have 2 clients that are entitled for 5 GB each, instead of one client for 10 GB.

A third reason is that keeping statistics of the usage of the resources can help the WHC manager for improving his computers' performance, avoiding accidents, and learning how to utilize them in a more efficient way. These statistics can take many different forms, for example the weekly throughput of data of FTP traffic, and thus can be used to analyze a variety of different aspects of the computers' performance.

Organizing all the information regarding computers' resources is performed by utilizing a repository. In information technology, a repository is a central place in which an aggregation of data is kept, maintained and managed in an organized way. A repository may be directly accessible to users or may be a place from which specific databases, files or documents, are obtained for further relocation or distribution in a network. A database is defined as a collection of data, organized in such a way that its contents can be easily accessed, managed, and updated. Typically, the repository is hierarchical. For example, a network might comprise a group of computers, each having its own configuration and users' list. Each user on the list further has its own configuration (e.g. disk quota, permissions), and so forth.

A tree structure is a method for placing and locating hierarchical data entities in a repository. A node (or a decision point) in the tree can have an unlimited number of branches (also called "children"), though usually no more than several dozens, or as little as one branch. The endpoints are called leaves. Data can be stored in both nodes and leaves. The starting point is called the root. The maximum number of children per node is commonly referred to as the "order of the tree".

Some nodes/leaves can reflect information that is local to the network object. For example, the current CPU load can be a leaf on the tree. In order to reflect an up-to-date value, this leaf should be frequently updated.

Since nodes and leaves can be expressed as Extensible Markup Language (XML) tags (definition given below), XML structure can be used as a hierarchical database. This notion is disclosed in WO 0133433.

XML is a flexible way to create common information formats, according to a formal recommendation from the World Wide Web Consortium (W3C). It is similar to the well-known HTML language, which is used to generate Web pages content. Both XML and HTML contain markup symbols to describe the contents of a page or file. However, while HTML describes a Web page (mainly text and graphic images) only in terms of how it should be graphically displayed, XML describes the actual content of the information in the page, such as—the number representing CPU usage.

Keeping the information in an XML structure, as will be later described in the invention, has several advantages:

The XML structure supports a hierarchical structure of a repository. This allows the operator (e.g., a WHC manager) an access to the information regarding all the computers, associated with the same repository, from one place (i.e., the root), instead of accessing to, and retrieving information from, individual computers. The computers, including the root computer, may be a part of a LAN. This approach is easier, faster, and more general, as it requires handling only one computer, instead of several computers.

Extendibility—new nodes and information can be added, without the need to modify existing information.

The information is retained in a human-readable format, which allows browsing and locating the information using any browser.

Determined information—the place (and format) for locating each information entity is defined as part of the XML of the specific element.

The tree can be of an unlimited depth, as new levels can be added underneath existing ones.

Currently, the market offers a variety of tools for reading and writing XML files, and, therefore, managing the information can be carried out using external programs that the user can write.

Although an XML-based repository can be stored as a single file, it is advantageous to use multiple smaller files when implementing it, for the following reasons:

Smaller files lower the computational effort whenever updating the file. Since an XML file containing a database may comprise a substantial quantity of data, the computational effort of updating such a file can be substantial as well, and, hence, updating, adding or deleting data from the database can be a very slow process. Furthermore, XML files are sequential. From a data processing point of view, sequential files have several drawbacks. For example, records may have different sizes, making modifications nontrivial. Therefore, the smaller the size of the file, the lower the computational effort for updating the file.

Unlike relational databases, that have a mechanism that ensures integrity of the information, an XML file is a standard system file, thus can be corrupted by a system crash during the update process. Smaller files lower possibility of such crash.

Handling an XML file requires loading the whole file into fast access memory. Hence, handling an XML-based database, in which the data is broken into many smaller files, requires a significantly smaller amount of memory resources.

A calling application is an external program that accesses the repository to retrieve or update required information about the resources or configuration of the computers. It may come from both the WHC manager side and client side. For example, it could be a program that is responsible for billing the clients for the resources they consumed. This program sends a request to the repository to retrieve the information about each client. Conversely, a client may wish to verify the correctness of his billing, so he could use a program of his own to check his account in the repository. Normally, a calling application must direct the repository to the exact place from where the required information should be retrieved.

Although using XML as a hierarchical database is known in the art, the current solutions suffer from several drawbacks. For example, they are not easy to operate, and offer very few capabilities beyond being a mere tool for storing information. One important feature these XML databases lack, is the ability to access information in a way which is transparent to the operator. In other words, in these type of databases, the operator (i.e., user) must be directly involved in the process of accessing the exact location in the database, in order to retrieve the required data. This procedure can be wasteful in terms of computer time, and imposes rigidity and encumbrance—as it necessitates that the calling application would always know where to seek the information in the database, instead of just asking for it. Another major drawback is that in order to access data that is contained in a certain computer, it is necessary to access the computer itself, and there is no single central computer to handle the requests. This could be problematic whenever trying to retrieve information from several computers, as for each one there is a need for a single request.

SNMP (Simple Network Management Protocol) is used for a similar purpose as XML-based databases. It is a widely used network management protocol. SNMP is designed for the application level in order to enable transition of management-related information between an NMS (Network Management System) and "agents" installed in network devices that collect this information from the network devices, and perform management operations on the relevant network device, such as setting parameters. The use of SNMP enables a network manager to access information related to the network. It uses a repository, which stores information about the managed objects, and a program that manages the repository (that may reside on a remote computer). In order to control several devices from a central place, there should also be a "root" computer through which information about the network's computers passes, to and from the managing computer.

However, the SNMP suffers from several drawbacks:

The information exchanged between the computer that manages the repository, and the "root" computer, is passed as clear text (not encrypted). Therefore, the information is exposed to malicious objects.

The tree-level of an SNMP repository is limited, and, hence, the information presented is limited as well.

The SNMP protocol uses User Defined Protocol (UDP), which is a communication protocol that is not "delivery-guaranteed", i.e., there is no mechanism to guarantee that information that is transmitted from a source will arrive to the intended destination, and failed messages are not returned as an indication for transmissions failure.

The SNMP uses the ASN.1 format, which is based on assigning a unique number to each property, in order to describe the elements to be changed. This format, which uses numbers, rather than text-based commands and names, makes it very hard to understand SNMP commands. Moreover, it forces users to use cumbersome tools for every SNMP operation, even a simple one, instead of writing a simple command line.

SNMP uses ports 160 and 161, which might be closed when a firewall is installed in front of the computer at the data center. Consequently, users cannot access their information from their home computer.

SNMP is incapable of switching from one computer to another. In other words, it does not support the hierarchical tree property of XML, as suggested in the invention. Thus, when accessing several computers, each command should be directed to the relevant computer, instead of dispatching all of the commands together to the root. Furthermore, this requires that each computer will have its own unique IP address in order to allow the calling application an access to the relevant computer. The latter feature is not recommended, as such international IP's are getting scarce. In order to solve this problem, a load-balancer can be used, to regulate traffic of information among a plurality of computers, under a single IP address. However, when the managed computer is located behind a load-balancer, it has only a local address, and thus SNMP cannot be used. Therefore, SNMP is a technology which may be used only in cases of single-computer level.

SOAP (Simple Object Access Protocol) is a protocol for communicating between programs running on different computers or operating systems by using HTTP and XML as a mechanism for exchanging information. SOAP specifies exactly how to encode an HTTP header and an XML file, so that a program in one computer can call a program in another computer and exchange information. It also specifies how the program, thus contacted, can respond. However, in SOAP, the information cannot be encrypted, and does not use exclusively XML for the information inside the request. Moreover, a request for the information about a certain computer must be sent directly to this computer, thus requiring several requests in order to gather information from several computers.

The solutions specified above have not provided a satisfactory solution for the problem of easily and efficiently managing computer resources, or to other problems that pose a similar challenge.

It is an object of the present invention to provide a method for efficiently managing computer resources, consumed by remote users, in both data memory and processing time.

It is another object of the present invention to provide a method for allowing a user to exploit computer resources that are distributed among several computers while communicating with only one (i.e., central) computer.

It is still another object of the present invention to provide a method for allowing a computer system manager to dynamically change computers' resources that are allocated to users, such that the changes are transparent to the users.

It is a further object of the present invention to provide a method for managing computer resources, consumed by remote users, which allows calling applications an easy and convenient access to the data required for management.

Further purposes and advantages of this invention will appear as the description proceeds.

SUMMARY OF THE INVENTION

The present invention is related to a method for allowing a computerized manager to transparently allocate computational resources to a plurality of users, comprising:

a. providing a plurality of computers or servers for accommodating said computational resources or for storing data, said computational resources and said data being arranged as hierarchical repository;

b. providing a root computer, being an interface between said users and said computers or servers, said root computer being capable of:

i. communicating with said users;

ii. communicating with said computers or servers;

iii. controlling said computers or servers, and iv. allowing said manager to allocate computers resources to said users;

c. storing information in said computers or servers, in a local repository or in the system files of said computers or servers;

d. whenever desired, retrieving stored information from said computers or servers;

e. dynamically allocating, by said manager and through said root computer, required computational resources for each of said users, without interfering the continuous operation of said users.

Preferably, the computers/servers, the computers resources, the stored information, the users, and the associated paths are all arranged as hierarchical repository, such that the hierarchical structure of the hierarchical repository is apparent to users interfacing with it, but the inner organization of information in this hierarchical repository (i.e., in terms of which information is kept on which server) is transparent to them. Furthermore, the root computer preferably comprises a primary agent, which is responsible for performing any of the following actions:

a) receiving requests from a user b) processing said requests c) locating the required resources in said repository, and d) performing said requests on said resources, if needed e) introducing to said user the answer for said requests, if needed.

In addition, each of the servers preferably comprises a secondary agent. This secondary agent receives requests from the primary agent, for performing requests on behalf of the user, on the server.

The communication between the users and the root computer, and between said root computer and the computers/servers, is preferably implemented by the TCP Internet communication Protocol (TCP/IP).

The repository is preferably accessed using requests in XML format, which accesses a file that holds the information, or a plurality of files, each of which handling a different portion of the repository. Optionally, each computer in the computers/servers comprises a single XML file associated with the repository. The repository can also handled by a plurality of database tables, each of them handling a different portion of the repository.

The method may further include the utilization of templates, for the purpose of saving memory space. Each template is associated with data that is shared by at least two nodes, and is accessible from these nodes by means of links. These links may be activated, whenever required, by either the primary or secondary agents, when present.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 2 illustrates an XML-format implementation of the hierarchical structure depicted in FIG. 1;

FIG. 6 illustrates a response to a request for retrieval of the list of users, according to one aspect of the invention; and FIG. 7 illustrates a response reporting an error, according to one aspect of the present invention.

DETAILED DESCRIPTION OF PREFERRED EMBODIMENTS OF THE INVENTION

Figure 1:
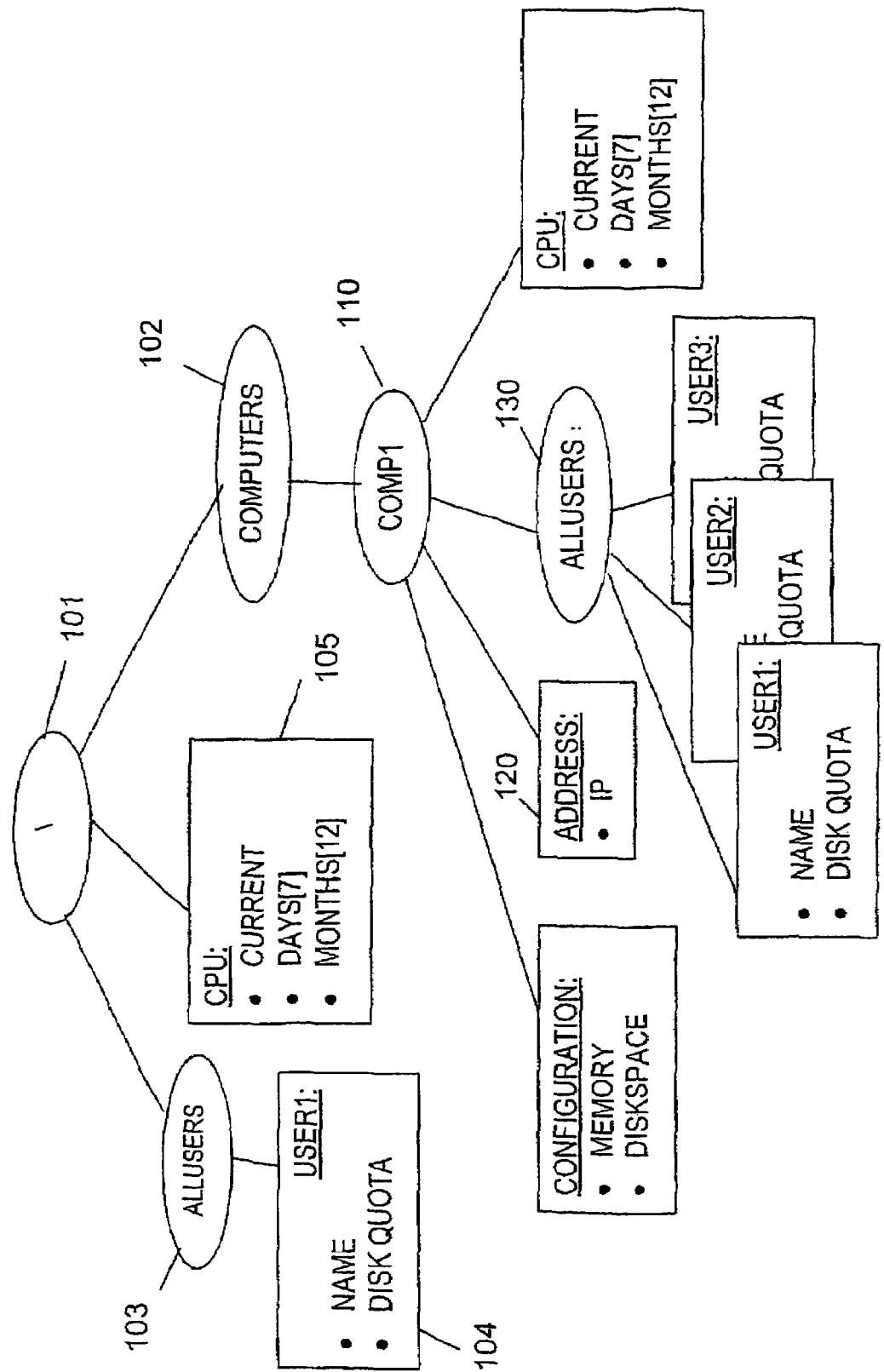
FIG. 1 schematically illustrates an exemplary hierarchical structure of computers network, according to the preferred embodiment of the present invention.

FIG. 1 schematically illustrates an exemplary hierarchical structure of computers network, according to the preferred embodiment of the present invention. The data associating users (e.g., user1, 107) with the corresponding (i.e., allocated) computers' resources (e.g., CPU of COMP1, 110), together with the (various) applications software (e.g., an AutoCad application residing in COMP1, 110) and corresponding resulting files, is organized in hierarchical repository (100), which is managed by computers resources manager 109 (hereinafter referred to as the 'Resources Service Provider'—RSP). By utilizing root computer 101, RSP 109 is capable of adding/removing users to/from the repository, and (optionally) changing resources allocations. Repository 100 allows computers resources to be easily and dynamically reallocated and the resulting files to be easily retrieved, relocated or distributed in the repository, in order to fully exploit the RSP's computers resources. The transparency of activities to the users, the changing computers resources, and the relocating and/or distributing files in repository 100, do not interfere with the normal activities of the users.

The RSP 109 initially allocates computers' resources to users according to their contracts, and may change the allocation according to the specific needs of the each user. In addition, the allocation process may be carried out by the RSP 109 automatically, by employing statistical criteria that reflects the actual usage of the computers resources by the users/clients. For example, if USER2 utilizes only 50% of its allocated memory, some, or all, of the remaining memory capacity may be allocated to, e.g., USER1, which may require additional memory. USER1 and USER2 will not be aware of, and interfered by, the change in the resources reallocation.

Unlike the resources available to the users, the actual users' accounts are preferably distributed in the repository, such that every server has its own users. For example—server COMP1 (110) holds the accounts of USER1 (107) and USER2 (113). These users can log into the server, and perform operations on it. In order to manage the users in an easy way, a central list holds the information about all the users, on all the machines, represented by the "ALLUSERS" node (103) at the top level (outside the repository). It can be implemented in several ways:

As a real node, that should be updated whenever a user is added or removed from every server. This method requires extra computation and communication, on every update. If queries on this information are relatively rare, the result is therefore inefficiency. This solution is intended for the cases that many queries are performed—the information is retrieved locally, without any needed communication.

As a "virtual node"—to be described later. This means querying each server, once the information is requested from the root node (101). This approach saves communication and operations on every update, but requires them on each query. Therefore, it is more efficient in cases of relatively few queries, and relatively many updates.

Both implementations have their advantages, and the best approach should be taken according to the typical operations in the system. Standard solutions require the information to be kept according to either one of the approaches, and changing from one to the other requires changing the client software as well.

In order to activate an application in the repository, a user sends a 'request' to root computer 101, which contains a primary agent that manages repository 100b. The request interpretation involves identifying the identity of the request sender (i.e., user) and the information requested by the user, after which the primary agent either retrieves the information for the user, or directs the user, through the hierarchical repository, to a secondary agent on a server that can supply the information, without the user knowing the location (i.e., computer ID) of the secondary agent, nor the memory location(s) wherein his files are stored (i.e., the latter process being transparent to the user).

ALLUSERS 103 is a virtual node, which resides entirely inside the system of root computer's 101. The task of the virtual node is to maintain a list which includes all the users (e.g., user1, 104), for allowing an easy way for handling the computers resources associated with each user. The virtual node may contain procedures, in which case the procedures will be configured to accept requests from users and to fetch data from the repository.

IP address 120 of computer 110 (i.e., "COMP1") can be located in "\COMPUTERS\COMP1\IP". The first character "\" on the left denotes root computer 101 followed by nodes COMPUTERS (102) and COMP1 (110). The last entity ("\IP") refers to the address node 120 representing the IP address of COMP1 (110). Each computer (e.g., COMP1 110) can thus maintain its information (such as the host name, the IP address etc.) in this hierarchical fashion.

FIG. 2 illustrates the repository depicted in FIG. 1 in XML format, according to the preferred embodiment of the present invention. The hierarchical structure of the repository is shown with the more indented entries representing nodes which are further down the tree. The " . . . " is not a part of the XML syntax, and inserted only for the purpose of denoting a missing text.

There are various ways to avoid the problems discussed above, which are associated with storing the XML-based repository in a single file. According to the present invention, instead of utilizing a single file, the repository can be divided into a plurality of files. For example, each node and/or leaf could reside in a separate file. Thus, the data entities are small files, ensuring fast processing (accessing the files, updating, deleting and adding records).

According to another embodiment of the invention, each computer comprises a single XML file that is associated with the repository, which maintains part of the repository's information, relating to the hosting computer. For example, the information about COMP1 (110) is kept locally on the COMP1 server, information about COMP2 (111 ) is kept locally on the COMP2 server, etc.

The XML-based repository disclosed in this invention enhances the ease of operation and efficiency of existing prior art repository management techniques, by adding several key features. A first feature is Encapsulation.

Encapsulation

The invention offers encapsulation of the source of the information from the calling applications. This feature rids the calling application from the responsibility of specifying to the repository the exact location the information, which is required by the calling application, should be retrieve from.

Whenever the manager of the data network requests data (i.e., by utilizing a corresponding calling application and the API—to be described later), which is associated with any of the network computers' sources and configuration, the request is forwarded to an "agent" residing in the root computer (hereinafter referred to as the 'primary agent'), the task of which is to handle this request. 'Handling' a request involves identifying the data required by the calling application (i.e., by analyzing the request), seeking the required data in the tree-structured repository, retrieving the data and forwarding the data to the manager. Exchanging data between a calling application and an agent is a feature that is well known to persons skilled in the art.

According to the present invention, the calling application needs only to specify to the agent which information it requires, after which the agent finds and retrieves the information. The calling application does not need to know the location of the required data in the repository. This "root", or primary agent, has three possibilities from where to retrieve the required data:

i. from its own body, i.e., the repository residing in the root computer;
ii. from a repository residing in another computer; and
iii. from a virtual memory in the operating system—to be described herein below.

According to the preferred embodiment of the invention, each one of the computers has a "secondary agent", the task of which is to obtain required data associated with its computer, and to communicate with the primary agent. Accordingly, after the request is forwarded to the primary agent, the primary agent analyzes the request, locates the location of the required data in the tree-structured repository, and addresses to (i.e., communicates with) the corresponding secondary agent. The secondary agent responds by retrieving the requested information from its associated computer, and forwarding the retrieved information to the primary agent (i.e., the requester). After the primary agent obtains the required data, it, then, forwards the data to the calling application (i.e., to the network manager).

The notable advantage here is that the calling application never knows from where the information is actually retrieved. This encapsulation feature thus provides a better flexibility in utilization of calling applications (as there is no need to change them all the time), and makes it possible to move the information around in the computer, whenever required, in a way which is transparent to the outside user/requester. For example, one might decide to keep some information about the specific computers (such as the number of CPUs) on the root node (101) as well, as this information is rarely changed. The result is that queries about \COMPUTERS\COMP1\numbver_of_cpus would be performed on the primary agent (101), and not forwarded to the specific secondary server (110). Another option is to keep the value in the primary agent of the server itself, and not retrieve it on every request. The third alternative is, of course, to actually query the hardware of the server 110, whenever the information is needed. Whatever option is selected, the interface with the user remains unchanged.

According to one aspect of the present invention, a user in the network may also obtain data from the repository in essentially the same manner as does the network manager. For this purpose, the user sends a request to the root computer by employ a corresponding calling application, and its primary agent reacts essentially in the same manner described above, i.e., it analyzes the request, seeks for the required data in the repository, or obtains it from the network manager, and forwards the resulting data to the requester user. However, there is a substantial difference between the network manager and a network user. The manager is also capable, by forwarding corresponding commands to the root computer, of manipulating the computers' sources that the users can utilize. A user is only capable of obtaining (i.e., 'reading') data related to its computer's sources, so as to allow him to check, e.g., the correctness of the bills associated with its computer's usage.

All the communication involved in the above described process—from the end-user who initially requests the data, to the root computer, and from the root computer to the rest of the computers in the networks—is carried out over the TCP/IP protocol, which guarantees safe transfer of the information. Virtual leaves/nodes According to one aspect of the present invention, some information may not be stored in a file, but rather, retrieved from a "virtual memory" place. This is carried out by using virtual nodes. Virtual nodes contain either information, which is frequently sought (and is not stored in the local repository by default), or a built-in application that retrieves and sets properties that are not kept in the repository, but are part of the operating system of the root computer. The virtual nodes' value is set/retrieved whenever required.

Unlike 'constant memory', which is implemented by XML file(s), the virtual nodes are operated by means of procedures. Every procedure is configured to interact with selected computer(s) or computer services, in order to allow it to obtain data therefrom, according to predetermined criteria, and to forward the obtained data to the root computer, whenever required. The required data does not reside anywhere in the repository of the primary agent, but, rather, it is generated upon request (i.e., whenever a procedure is 'activated' by the root computer). The output of each procedure (i.e., the obtained data) dynamically changes according to the data required by the root computer at a given time, and previously generated data, which is no longer relevant, is allowed to be lost.

Normally, information is retrieved whenever the agent searches the repository using the table name, column name, etc., and retrieves the relevant record. According to one aspect of the solution, the agent has another option. Using its programmed logic, the agent decides whether it should retrieve the information from the depository, or from a virtual node, if such exists. Because of the encapsulation feature discussed above, the calling application never knows the exact location in which this information is actually stored.

In an exemplary process, the operating system of a computer maintains a list of authorized users in a file. Referring again to FIG. 1, an agent of the server where USER1 is defined (110) receiving a request from a caller to retrieve the parameters of USER1 (107), performs a system call to retrieve this data from the relevant place in the operating system where USER1's information is located. The required data is returned to the caller as if it were a part of the repository. This process is transparent to the caller. The node ALLUSERS (103), which is a child of root ("\") computer 101, symbolizes a virtual node representing all the users in the network. It is further divided into specific virtual nodes, each of which containing information about specific user, which are the children of node 103, as can be seen in the leaf representing USER1 (104). This leaf describes the node that is actually on another server (107).

The user might request, in a similar manner, for information about every user in the network. When the agent would present the user with this universal list he asked for, it would appear to the user that this list is located right underneath the root computer "\" (101), and the agent simply obtain it from there. But what actually happens is this: when an outside user asks for "ALLUSERS" (103), the agent on the "\" (101) performs the process specified by the "ALLUSERS" virtual node 103: the agent goes to "COMP1" (110), and asks for his "ALLUSERS" list 130. It would do the same to all the other computers (aside for COMP1—110), and return the accumulated list. The calling application is not aware of the latter process. As mentioned above, it seems to the user that the universal users list, in its entirety, is located under the "\" (101).

The following example can further demonstrate the advantage of using virtual nodes over the repository. A user would like to get its computer's current CPU usage (which is a value that changes constantly). One solution would be to have a process, according to which the latter value is obtained every some period of time, and stored in the repository. However, this will cause wasting computer resources for operations rarely used. A better solution (and a more accurate one) would be to get the value only when requested. However, it is desirable that the user would use the same interface as when accessing the XML repository. This is where the virtual nodes play a major role. When the user's calling application asks the primary agent for this value, the primary agent communicates with virtual node 105 in the operating system, which is responsible for performing the process of obtaining the CPU usage. Once this value is obtained, the primary agent forwards it to the user as if it were taken from the repository.

Virtual nodes are one example of how to retrieve information from the system, and make it appear as if this information was retrieved from the repository, when the system features the encapsulation discussed above. Keeping the information in the virtual nodes, and retrieving it from there (instead of actually accessing the computer itself), makes it possible to change the source of the information, while keeping the calling application unchanged. This simplifies the accessibility to this information by providing a single and unified method to access it.

In addition to providing fast access to data, virtual nodes also perform actions related to it. For example, if the operation would only store the information in the XML database, then adding a user would require the calling application to run the relevant operating system tool for adding a user. Since the repository may be handled by various types of operating systems, the calling system's writer might not know what type of operating system he is to work with and how to activate it, and should authenticate himself to the system. The virtual nodes save him this work, as well as the need to know how to perform this task. New virtual nodes can be added according to need, whenever agreed upon by both sides (i.e., WHC and its client).

Some repository data can be retained as virtual and physical simultaneously. For example, the information relating to authorized users is simultaneously kept in both the operating system's file and in the repository. In this way, some operations can be carried out without accessing the system utilities. For example, the list of users can be retrieved by receiving the information directly from the repository, instead of the appropriate system file. These nodes are used whenever the user decides that there is a need to utilize the advantages of both methods of accessing information—at one time it would be more important to save process time, while at some other time, computer resources are more important).

Templates

Consider a network connecting many computers of the same type and the same configuration. Normally, the configuration of each computer is stored in its respective place in the repository. According to one aspect of the invention, a substantial space can be saved if only one configuration is stored at one table in the repository, and the records of the other computers point to this table. In other words, instead of allocating space in the record of each computer in the repository, for the storage of this configuration, each computer's record contains a link to the shared table. This is done, of course, only in cases when this shared configuration is common to all of the computers who use it. This is called a template property in the repository.

If there is a need to change a certain field of the configuration in one computer, to a value different than that in the shared configuration, this field is added to the record of this specific computer in the repository, and is assigned the new value. For example, whenever an additional amount of memory is added to one of the computers, the field "MEMORY" is added to it, and its new value overrides the default value in the shared configuration.

When a field is returned to its default value, either the new value can be saved in the repository, or the field can be erased from the relevant record, and its new value will again be the default one in the shared configuration. The latter approach requires more time, but saves appreciable space.

A template may comprise more than one field in it, and a record of a computer may contain more than one link to a template. When a certain field in the configuration of a computer is sought, then first, the fields in the record of this computer are scanned. If the sought field does not appear there, all the templates used by this record would be scanned, according to their order, until this field is found in one of them.

Figure 3:
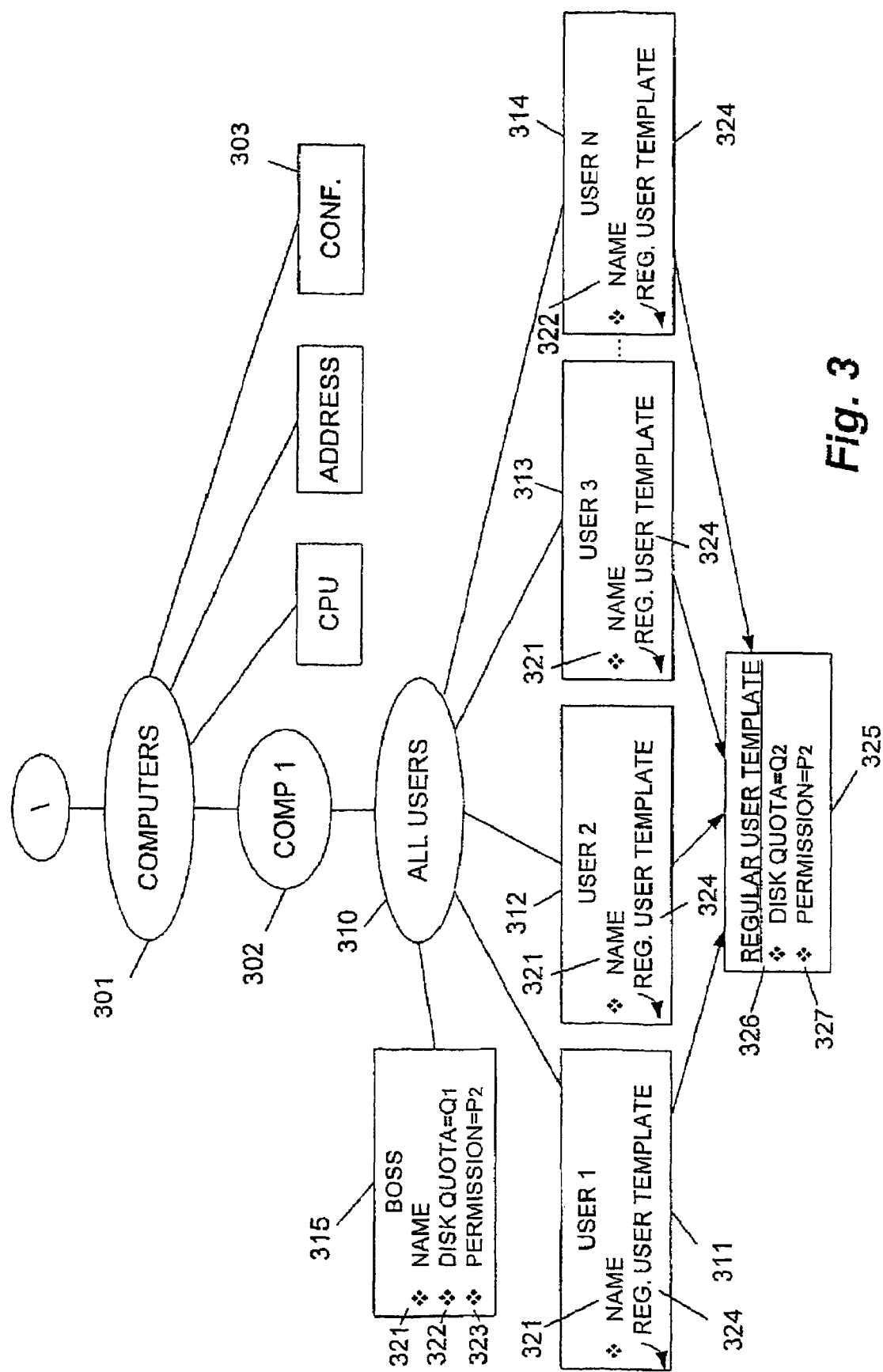
FIG. 3 schematically illustrates a partial view of the exemplary computers network depicted in FIG. 1, demonstrating utilization of templates.

FIG. 3 illustrates a detailed exemplary template property of a structure of a network under COMP1, according to the preferred embodiment of the present invention. Computer COMP1 (302) has N users, represented by corresponding nodes USER 1 through USER N (311 to 314, respectively), plus the boss, represented by the node BOSS (315). At the record of all of these nodes, including the boss, there is a field for the name 321 of the user. The boss's record also contains the field DISK QUOTA 322, whose value is Q1, and PERMISSION 323, whose value is P1. The other users (i.e., "regular" users: USER 311 to USER N) are allocated a lesser disk quota, Q2, and a lesser permission level, P2. However, unlike the boss, their records do not contain these two fields. Instead, since the values Q2 and P2 are common to all the regular users, then for the purpose of efficiency, their records contain link "REG. USER TEMPLATE" (324) to template 325, which contains these fields. In this template (325), the fields of the disk quota 326 and permissions 327 are assigned their respective values, Q2 and P2. Similarly, if COMP1 (302) had the same configuration as many other computers under the same root, then another corresponding template could be used to store the configuration details, in which case this template would be a child of the COMPUTERS node (301), and the CONF node 303 of COMP1 302 would contain a link to it.

API Implementation

API (Application Programming Interface) is the interface by which an application program accesses the operating system or other services. An API is defined at source code level.

According to one embodiment of the invention, an API for accessing a repository should comprise commands for adding, deleting, updating and retrieving nodes/leaves. For example:

Add: for adding a new node/leaf to the repository. For example, adding a new user to an existing computer.

Delete: for removing an existing node/leaf, with all the nodes/leaves underneath. For example, removing a computer.

Update: for updating information in an existing leaf. For example, increasing the disk quota of a user.

Get: for retrieving information about a specific node/leaf. For example, the IP of a computer.

GetList: for retrieving the information of several nodes/leaves in the repository of the same level in the tree. For example, the list of users.

According to one embodiment of the invention, the API corresponds to the XML syntax.

Figures 4, 5:
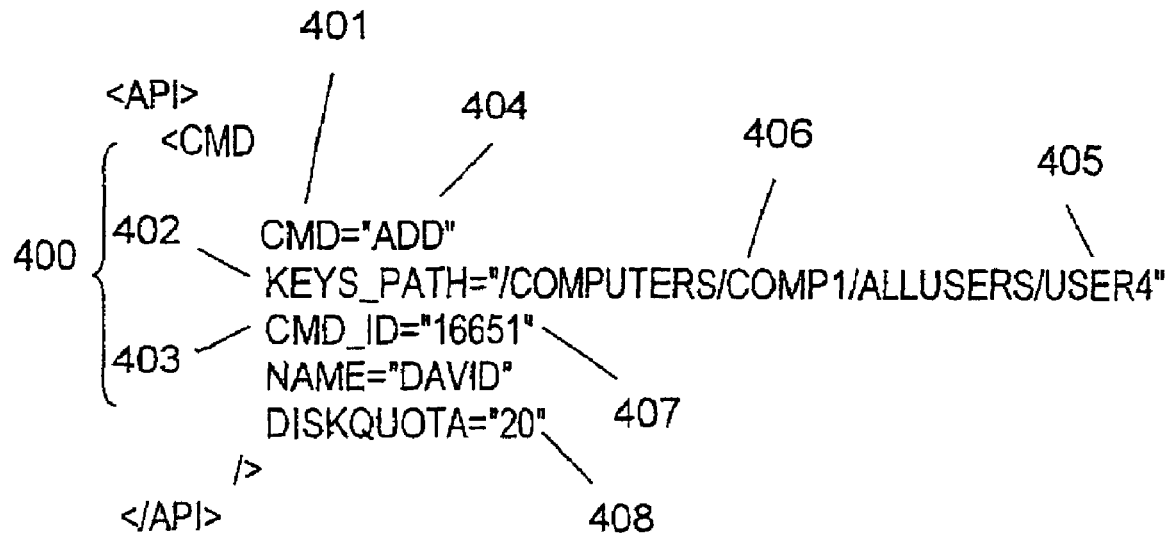
FIG. 4 illustrates an API command, according to a preferred embodiment of the present invention.
FIG. 5 illustrates a response to the request depicted in FIG. 4, indicating a success, according to one aspect of the present invention.

FIG. 4 illustrates an exemplary API command code, according to one aspect of the invention. This example relates to FIG. 1. An API command code, such as command code 400, must include at least the following elements:

Operation type (CMD 401 in this example);

The object node/leaf (KEYS_PATH 402 in this example).

Command code 400 may also comprise a request number 403, which is a unique ID for associating a response (from the repository) with a corresponding request, as well as additional parameters.

In this example, the command 400 instructs the agent to add (404) a new user, USER4 (405), to the computer COMP1 (406). The name of the user is "David" (405), and his disk quota should be 20 (408).

FIG. 5 illustrates an exemplary result in response to the request depicted in FIG. 4, according to one aspect of the invention. The response, (according to the example, and shown in the "RESULT" field 501) is "OK".

FIG. 6 illustrates an exemplary response to a request for retrieving the users list, according to a preferred embodiment of the present invention. The example refers to the repository illustrated in the previous figures. In the reply, each record is returned as a "<NODE" tag (601).

FIG. 7 illustrates an exemplary "Error" response, according to one aspect of the invention. The response (700) contains ID number 701 of the command, an error number 702, an error description 703, and the result 704. Unlike the case in FIG. 5, the result returned here is "ERROR" (704).

Of course, a request can include several commands. In such a case, there is one "root" node in the request, which holds the commands. According to one aspect of the invention, if a command fails, several alternatives may be adapted:

Continuing the execution of the other commands.

Stopping the execution of remaining commands, but keep the results of the operations completed so far.

Stopping the execution of remaining commands, and undo the effect of all the earlier commands.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A method of allocating computational resources of a distributed computerized system having multiple user accounts, the method comprising:

developing a hierarchically arranged repository of resources usage data of the user accounts, the repository accessible by a root computer of the distributed computerized system and represented as a single logical XML file that is independent of file system structure on the underlying storage medium, wherein the distributed computerized system includes a plurality of virtual nodes such that data corresponding to the virtual nodes is located on a non-root computer or is not part of a physical XML file that stores the single logical XML file, each virtual node corresponding to a node of the XML file and is generated as result of execution of at least one Operating System procedure, and the data returned by the at least one procedure is formatted in XML syntax as the virtual node, and wherein a call to execute at least one Operating System procedure is transmitted using an API call and is formatted in XML syntax; and using the root computer for dynamically allocating the computational resources between the user accounts based on information contained in the repository, wherein secondary agents are used to configure the computational resources of a sub-branch of the single logical XML file.

2. The method according to claim 1, wherein (i) a hierarchical structure of the repository is apparent to the user accounts and (ii) an inner organization of information in the repository is transparent to the user accounts.

3. The method according to claim 1, wherein the root computer comprises a primary agent performing the following actions:

receiving requests for configuration of computational resources from the user accounts;

using the repository to locate available computational resources;

configuring the available computational resources; and replying to the user accounts in response to the requests regarding the status of the configured computational resources, wherein the user accounts correspond to non-privileged users and administrative users.

4. The method according to claim 3, wherein each of the agents receives the requests for configuration of the computational resources from the primary agent.

5. The method according to claim 1, wherein communications between the users and the root computer are implemented using the TCP Internet communication Protocol (TCP/IP).

6. The method according to claim 1, wherein the repository is maintained by an XML file.

7. The method according to claim 1, wherein the single logical XML file is maintained by a plurality of XML files, each maintaining a different portion of the repository.

8. The method according to claim 1, wherein the repository is maintained by a plurality of database tables, each database table maintaining a portion of the repository.

9. The method according to claim 1, wherein data for each computer or server is stored in a single physical XML file associated with the repository.

10. The method according to claim 1, further comprising utilizing templates associated with information shared by at least two nodes of a tree structure of the repository, the templates accessible from the nodes by means of one or more links.

11. The method according to claim 10, wherein (i) the one or more links are activated by a primary agent of the root computer or secondary agents of the user accounts, (ii) the primary agent receives requests for computational resources from the user accounts, uses the repository to locate available computational resources, executes the requests using the available computational resources, and replies to the user accounts in response to the requests, and (iii) the secondary agents receive and execute requests of the primary agent.

12. The method of claim 3, wherein the primary agent performs any of the following:

receiving requests for configuration from a user;

processing the requests;

locating the required resources in the repository;

configuring the resources in response to the requests; and replying to the user regarding completion of the requests.

13. The method of claim 1, wherein the root computer only performs administration of the computational resources, and the requests are handled by other computers of the distributed computerized system.

14. The method of claim 1, wherein the root computer performs both administration of the computational resources, and handles the requests.

15. The method of claim 1, wherein the root computer decides whether to handle the requests based on a virtual node which a command to configure the resources attempts to read or modify.

16. The method of claim 1, wherein the secondary agent, located on the same computer as the available computational resources, performs administration of the computational resources.

17. The method of claim 1, wherein data for at least one of the user accounts, business logic information relating to the user account and user application data is stored in an operating system file.

18. The method of claim 1, wherein configuration of the system also includes business logic information relating to the user accounts.

19. The method according to claim 1, wherein each of the user accounts is associated with a remote computer, multiple remote computers or a remote server.

20. A computerized system for allocating computational resources of a distributed computerized system having multiple user accounts, the system comprising:
   a root computer; and
   a memory storing instructions of an operating system and an application program that, when executed by a processor of the root computer, provides:
      first means for developing a hierarchically arranged repository of resources usage data of the user accounts, the repository accessible by the root computer of the distributed computerized system and represented as a single logical XML file that is independent of file system structure on the underlying storage medium,
   wherein the distributed computerized system includes a plurality of virtual nodes such that data corresponding to the virtual nodes is located on a non-root computer or is not part of a physical XML file that stores the single logical XML file, each virtual node corresponding to a node of the XML file and is generated as result of execution of at least one Operating System procedure, and the data returned by the at least one procedure is formatted in XML syntax as the virtual node, and
   wherein a call to execute at least one Operating System procedure is transmitted using an API call and is formatted in XML syntax; and
      second means for using the root computer for dynamically allocating the computational resources between the user accounts based on information contained in the repository, wherein secondary agents are used to configure the computational resources of a sub-branch of the single logical XML file.

21. The system of claim 20, further comprising templates associated with information shared by at least two nodes of a tree structure of the repository, the templates accessible using one or more links.

22. A computer useable storage medium having computer executable program logic stored thereon for executing on a processor, the computer executable program logic including a computer program code means adapted to perform a method of allocating computational resources of a distributed computerized system having multiple user accounts, comprising:
   computer program code means for developing a hierarchically arranged repository of resources usage data of the user accounts, the repository accessible by a root computer of the distributed computerized system and represented as a single logical XML file that is independent of file system structure on the underlying storage medium,
   wherein the distributed computerized system includes a plurality of virtual nodes such that data corresponding to the virtual nodes is located on a non-root computer or is not part of a physical XML file that stores the single logical XML file, each virtual node corresponding to a node of the XML file and is generated as result of execution of at least one Operating System procedure, and the data returned by the at least one procedure is formatted in XML syntax as the virtual node, and
   wherein a call to execute at least one Operating System procedure is transmitted using an API call and is formatted in XML syntax; and
   computer program code means for using the root computer for dynamically allocating the computational resources between the user accounts based on information contained in the repository,
   wherein secondary agents are used to configure the computational resources of a sub-branch of the single logical XML file.

* * * * *